M. NEILL.
NUT-LOCK.

No. 184,476.  Patented Nov. 21, 1876.

WITNESSES
Grenville Lewis
M. Church

INVENTOR
Michael Neill

UNITED STATES PATENT OFFICE.

MICHAEL NEILL, OF BLOOMINGTON, ILLINOIS.

IMPROVEMENT IN NUT-LOCKS.

Specification forming part of Letters Patent No. 184,476, dated November 21, 1876; application filed June 22, 1875.

*To all whom it may concern:*

Be it known that I, MICHAEL NEILL, of Bloomington, in McLean county, State of Illinois, have invented certain new and useful Improvements in Nut-Locks; and I do hereby declare the following to be a full, clear, and exact description of the same, reference being had to the accompanying drawings, forming part of this specification, in which—

Figure 1:
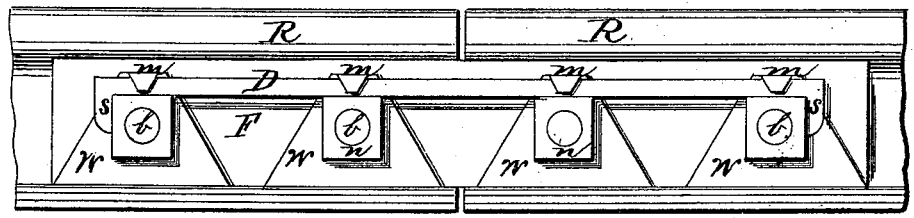
Figure 2:
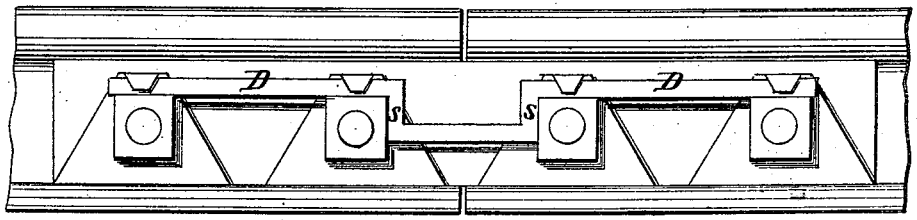
Figure 3:
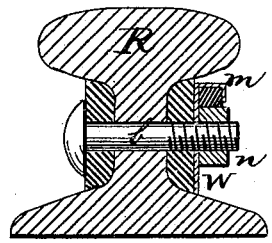

Figures 1 and 2 are side elevations, representing different modifications of my invention. Fig. 3 is a vertical cross-section.

Similar letters of reference in the accompanying drawings denote the same parts.

The object of this invention is to provide, for use in connection with railroads, a simple, durable, and efficient fastening for securing the fish-plate nuts from turning in consequence of the vibrations of the rails, and thus allowing the bolts to work out.

The invention consists in certain details of construction, which will be hereinafter more fully described, and pointed out in the claim.

In the drawings, R is the railroad-rail; F, the ordinary fish-plate, secured to the rails by bolts *b b* and screw-nuts *n n.* D is the locking-bar, and *w w* are the sheet-metal washers. After the bolts are passed through the fish-plates the washers are slipped upon them; the nuts are then placed on and screwed up, so as to bring the washers firmly against the sides of the fish-plate. The bar D is then placed in position, with its edge bearing against the edges of all the nuts at that joint; and, astly, the corners *m* of the washers are turned down over the edge of the bar at different points, so as to hold the latter securely in place. Stops *s s*, preferably at the end of the bar, prevent the latter from working endwise out of position.

I prefer to make the washers triangular in shape, arranging them with their base resting on the bottom flange of the rails; but this is not absolutely necessary, as the bar D prevents them from turning. The bar D may be arranged either above or below the nuts, preferably the former. It is much stouter and stronger than a simple sheet-metal fastening for the nuts, which latter has been found, in practice, to rust out too readily, and, after becoming partially rusted, to offer an ineffectual resistance to the turning of the nuts.

I am aware that it is not new to hold the nuts or a bar upon them by means of a plate underneath or on the outer surface of the nuts; and I do not, broadly, claim such a construction.

What I do claim, and desire to secure by Letters Patent, is—

The nut-lock described, consisting of the metal bar D, the ends of which are turned down over the corners of the nuts, the washers *w* placed underneath the nuts, and turned over on one side or corner to hold the bar to the nuts, all constructed and arranged as and for the purposes set forth.

MICHAEL NEILL.

Witnesses:
M. CHURCH,
E. S. KARNER.